United States Patent
Klamt

(10) Patent No.: US 12,451,218 B2
(45) Date of Patent: Oct. 21, 2025

(54) COSMOPLEX: SELF-CONSISTENT SIMULATION OF SELF-ORGANIZING SYSTEMS

(71) Applicant: DASSAULT SYSTEMES AMERICAS CORP., Waltham, MA (US)

(72) Inventor: Andreas Klamt, Leverkusen (DE)

(73) Assignee: DASSAULT SYSTEMES AMERICAS CORP., Waltham, MA (US)

( * ) Notice: Subject to any disclaimer, the term of this patent is extended or adjusted under 35 U.S.C. 154(b) by 1055 days.

(21) Appl. No.: 16/982,290

(22) PCT Filed: Mar. 15, 2019

(86) PCT No.: PCT/EP2019/056636
§ 371 (c)(1),
(2) Date: Sep. 18, 2020

(87) PCT Pub. No.: WO2019/179905
PCT Pub. Date: Sep. 26, 2019

(65) Prior Publication Data
US 2021/0020273 A1 Jan. 21, 2021

(30) Foreign Application Priority Data
Mar. 19, 2018 (DE) ............ 10 2018 002 184.0

(51) Int. Cl.
*G16C 20/30* (2019.01)
*G06F 30/20* (2020.01)
(Continued)

(52) U.S. Cl.
CPC ............ *G16C 20/30* (2019.02); *G06F 30/20* (2020.01); *G16C 10/00* (2019.02); *G16C 60/00* (2019.02); *G06F 2111/08* (2020.01)

(58) Field of Classification Search
CPC ........ G16C 20/30; G16C 10/00; G16C 60/00; G06F 30/20
See application file for complete search history.

(56) References Cited

U.S. PATENT DOCUMENTS

| | | | |
|---|---|---|---|
| 6,212,485 B1 | 4/2001 | Nakano et al. | |
| 2009/0094006 A1* | 4/2009 | Laidig | G16C 20/30 703/2 |

(Continued)

FOREIGN PATENT DOCUMENTS

| | | |
|---|---|---|
| CN | 106446583 A | 2/2017 |
| CN | 106897476 A | 6/2017 |

(Continued)

OTHER PUBLICATIONS

Myroslav Holovko, Volodymyr Shmotolokha, Taras Patsahan, Thermodynamics of Molecular Liquids in Random Porous Media: Scaled Particle Theory and the Generalized Van der Waals Equation, Physics of Liquid Matter: Modern Problems, 2015, vol. 171, pp. 3-30 (Year: 2015).*

(Continued)

*Primary Examiner* — Karlheinz R. Skowronek
*Assistant Examiner* — Emilie A Neulen
(74) *Attorney, Agent, or Firm* — Oblon, McClelland, Maier & Neustadt, L.L.P.

(57) ABSTRACT

A method for simulation, in particular for computerized calculation, of at least one physical property of a system of one or more chemical species that includes at least one chemical species dissolved in at least one inhomogeneously distributed chemical species, using a quasi-chemical calculation based on the statistical thermodynamics of pairwise interactions of molecule surface segments. According to the invention, pressure, that arises from the statistical thermodynamic over- or underpopulation of spatial regions, interacts as an additional continuum response function with the (Continued)

Figure 1:
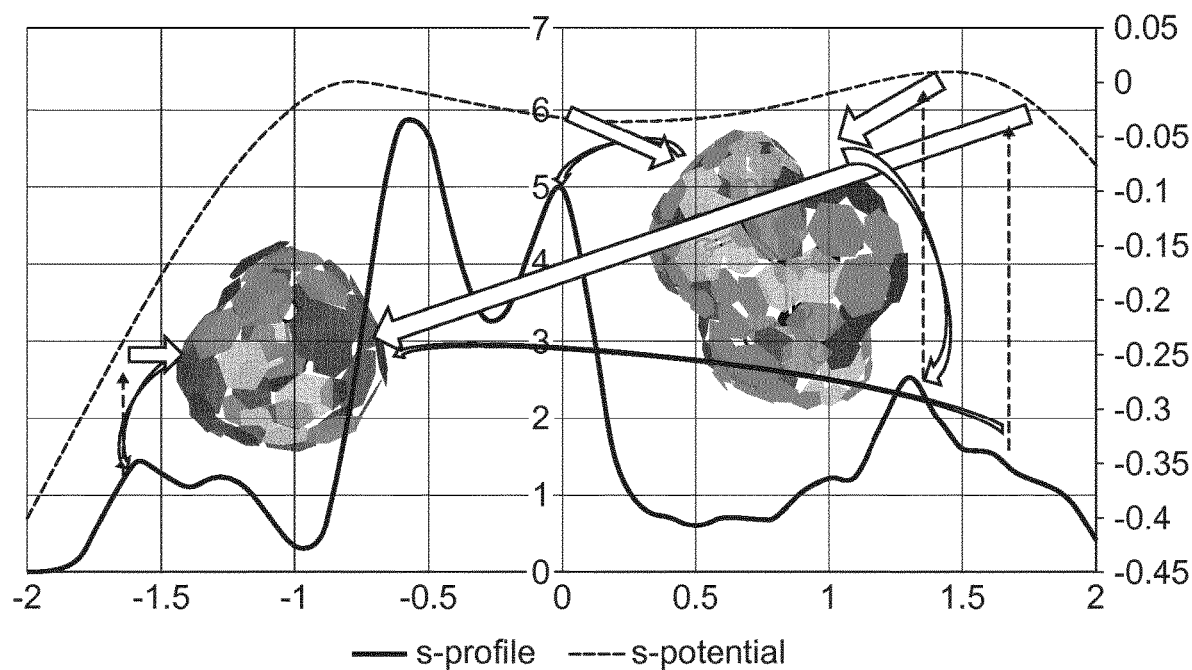

atomic volumes and thus influences the thermodynamic weight of a molecular state in the system, during the iterative calculation of the statistical thermodynamic distribution of molecules in 1-dimensionally, 2-dimensionally, or 3-dimensionally structured simulation volumes of liquid systems.

7 Claims, 5 Drawing Sheets

(51) Int. Cl.
  *G16C 10/00* (2019.01)
  *G16C 60/00* (2019.01)
  *G06F 111/08* (2020.01)

(56) References Cited

U.S. PATENT DOCUMENTS

| | | | |
|---|---|---|---|
| 2010/0273664 | A1 | 10/2010 | Lange et al. |
| 2015/0134315 | A1 | 5/2015 | Sarmiento et al. |
| 2017/0083688 | A1 | 3/2017 | Chen et al. |

FOREIGN PATENT DOCUMENTS

| | | |
|---|---|---|
| EP | 0 896 286 A2 | 2/1999 |
| WO | WO 97/30401 A1 | 8/1997 |
| WO | WO 00/10067 A2 | 2/2000 |
| WO | WO 2013/142630 A1 | 9/2013 |
| WO | WO 2017/121641 A1 | 7/2017 |

OTHER PUBLICATIONS

Jean-Christophe Pain, Thomas Blenski, Self-consistent approach for the thermodynamics of ions in dense plasmas in the superconfiguration approximation, Journal of Quantitative Spectroscopy and Radiative Transfer, vol. 81, Issues 1-4, 2003, pp. 355-369. (Year: 2003).*

Harry F. Ridgway, John Orbell, Stephen Gray, Molecular simulations of polyamide membrane materials used in desalination and water reuse applications: Recent developments and future prospects, Journal of Membrane Science, vol. 524, 2017, pp. 436-448. (Year: 2017).*

Y. Wang, D.J. Srolovitz, J.M. Rickman, R. LeSar, Dislocation motion in the presence of diffusing solutes: a computer simulation study, Acta Materialia, vol. 48, Issue 9,2000,pp. 2163-2175, (Year: 2000).*

International Search Report and Written Opinion issued Nov. 25, 2019 in PCT/EP2019/056636 filed Mar. 15, 2019.

Klamt. A., et al., "COSMOmic: A Mechanistic Approach to the Calculation of Membrane-Water Partition Coefficients and Internal Distributions within Membranes and Micelles", J. Phys. Chem. B, 2008, vol. 112, XP-002795661, pp. 12148-12157.

Bitterman, K., et al., Prediction of Phospholipid-Water Partition Coefficients of Ionic Organic Chemicals Using the Mechanistic Model COSMOmic, J. Phys. Chem. B, 2014, vol. 118, No. 51, XP-002795662, pp. 14833-14842.

Klamt. A., "COSMO-RS for aqueous solvation and interfaces", Fluid Phase Equlibria, Elsevier, vol. 407, 2016, XP029290782, pp. 152-158.

Klamt. A., et al., "Cosmospace: Alternative to Conventional Activity-Coefficient Models", Aiche Journal, 2002, vol. 48, No. 10, XP055365271, pp. 2332-2349.

Japanese Office Action issued on Nov. 21, 2023 in Japanese Patent Application No. 2021-500336 (with unedited computer-generated English translation), 6 pages.

Combined Chinese Office Action and Search Report issued Jan. 18, 2024 in Chinese Patent Application No. 201980019645.0 (with English Translation), 20 pages.

Lu, "Study on the Crystallization Process of Glycine with Additives and Molecular Simulation", Hebei University of Science and Technology, Dissertation for the Master Degree, May 26, 2017, 90 pages.

Klamt et al., "COSMOplex: self-consistent simulation of self-organizing inhomogeneous systems based on COSMO-RS", Phys. Chem. Chem. Phys., vol. 21, 2019, pp. 9225-9238.

* cited by examiner

COSMOPLEX: SELF-CONSISTENT SIMULATION OF SELF-ORGANIZING SYSTEMS

The invention relates to a method for simulation, in particular for computerized calculation, of at least one physical property of a system of one or more chemical species that includes at least one chemical species dissolved in at least one inhomogeneously distributed chemical species, using a quasi-chemical calculation based on the statistical thermodynamics of pairwise interactions of molecular surface segments.

FIELD OF THE INVENTION

The simulation of materials on a molecular level has achieved enormous technical importance, since it allows for the selection of optimal material components without the need for prior experimental work and because it provides mechanistic insight which may be of big importance for the control and improvement of the material or system under consideration. Liquid materials and soft quasi-liquid matter as emulsions and thermoplastic polymers are of special importance in general chemistry, pharmaceutical, agrochemical, biochemical, petrochemical and cosmetics industry and in cleaning products. While the understanding and simulation of molecules in homogeneous bulk liquids was and still is very important for wide areas of chemistry, inhomogeneous liquid systems as micelles, emulsions, molecules adsorbing to solid interfaces, liquid-liquid-interfaces and liquid-gas-interfaces, as well as liquid crystals and confined liquids are of increasing technical importance, especially in technical, pharmaceutical, agrochemical, biological, petrochemical and cosmetics industry.

BACKGROUND OF THE INVENTION

While the mainstream methods for the simulation of liquid systems are molecular dynamics (MD) or Monte-Carlo (MC) simulations, in which huge ensembles of molecules in a simulation volume and all of their 3D-interactions are explicitly simulated, quasi-chemical models [1] as UNIFAC [2] or COSMO-RS [3,4], which are based on the statistical thermodynamics of pairwise interactions of molecular surface segments, have been proven to be very efficient tools for simulation of bulk, homogeneous, liquid systems, saving about 4 orders of magnitude in computer time, and providing about twice the accuracy of MD/MC simulations for the free energies of molecules in solution [5,6]. But the quasi-chemical methods seemed to be limited to homogeneous liquids, while inhomogeneous liquids seemed to remain the domain of MD/MC simulations.

This changed when the COSMO-RS approach has been extended to the simulation of distribution and partitioning of solutes in 1-dimensionally inhomogeneous liquid systems, e.g. micelles and bio-membranes, in the COSMOmic method by Klamt et al. [7,8]. COSMOmic considers inhomogeneous liquids as layered homogeneous liquids, uses the COSMO-RS approach for each layer and calculates a solute in all of its possible states, i.e. conformations, positions, and orientations in front of the background of this layered liquid. But COSMOmic was limited by the fact that it could only simulate the behavior of solute molecules in infinite dilution in inhomogeneous, mostly micellar liquids, and it depended on external information about the structure of the inhomogeneous system, which usually had to be generated from prior, expensive MD simulations.

BRIEF SUMMARY OF THE INVENTION

The present invention comprises a generalization of the COSMOmic concept to the self-consistent simulation of inhomogeneous, self-organizing systems by the introduction of a pressure energy penalty, supplementing the other energy contributions, especially the quasi-chemical energy, of a molecule in a certain state within the inhomogeneous system. This pressure penalty reduces the probability of molecules to be in overcrowded spatial regions. Thus, the analogous algorithm, which was used in COSMOmic for calculating the distribution of solutes, can now be applied to the constituents of the inhomogeneous system, e.g. surfactant molecules and water. This overcomes the limitation of COSMOmic to infinite dilution and it removes the need for the expensive external information.

DETAILED DESCRIPTION OF THE INVENTION

The COSMO-RS method is based on concept, that all molecules composing a liquid system pass the information about their surface properties to a continuum description of the liquid. In its simplest version, the relevant surface properties are the surface polarization charge densities, as calculated in quantum chemical COSMO calculations, in addition with atomic volume information arising from the same calculation. Based on the resulting overall surface continuum composition, i.e. in its simplest version the solvent σ-profile, a thermodynamic response function, the σ-potential, is calculated by solving the quasi-chemical equations. Then the free energy of each molecule X in this solvent continuum S is calculated by summing up the individual σ-potentials of all surface segments of the molecule X.

In the COSMOmic method inhomogeneous, 1-dimensionally structured liquid systems, as micelles, biomembranes or liquid-liquid interfaces, are considered as layered homogeneous liquids, i.e. each layer, which has a typical width of 1-2 Angstrom, is considered as homogeneous in itself, but the compositions and hence the response functions of the layers differ along the direction of inhomogeneity, which we will denote as z-direction, further on. External information, usually generated by molecular dynamics simulations, is required, which provides the probabilities of the different atom types to be in the different layers. Then the atom probabilities are multiplied with their atom σ-profiles, and in this way the continuum composition, i.e. the layer-σ-profile, is generated for each layer. Next the thermodynamic response function is calculated for each layer as it is done in the bulk liquids. For the calculation of the free energy of a solute X in the simulated inhomogeneous system, all possible states, or more precisely a reasonably dense grid representation of all states, of the solute in the system are sampled, i.e. all center positions and orientations. If the solute X has multiple conformations, each combination of conformation, center position, and orientation is sampled. For each individual state the state-specific free energy of the molecule is calculated by determining the position of each surface segment, multiplying its area with the local, layer-σ-potential and summing these products up for all segments. From this the state-specific thermodynamic weight, i.e. the Boltzmann factor, of each state is calculated. The Boltzmann factors of all states are summed up to the partition function of the compound in the system. The free energy is calculated fundamentally as −RT ln(partition function), where R is the ideal gas constant, and T is the temperature.

Object of the invention is to improve a method for simulation of molecules in 1-dimensionally, 2-dimensionally, or 3-dimensionally structured simulation volumes of liquid systems by removing the need for external information.

The inventive method for simulation, in particular for computerized calculation, of at least one physical property of a system of one or more chemical species that includes at least one chemical species dissolved in at least one inhomogeneously distributed chemical species, using a quasi-chemical calculation based on the statistical thermodynamics of pairwise interactions of molecule surface segments includes the technical teaching that pressure, that arises from the statistical thermodynamic over- or underpopulation of spatial regions, interacts as an additional continuum response function with the atomic volumes and thus influences the thermodynamic weight of a molecular state in the system, during the iterative calculation of the statistical thermodynamic distribution of molecules in 1-dimensionally, 2-dimensionally, or 3-dimensionally structured simulation volumes of liquid systems.

The inventive method, mentioned as COSMOplex, comprises the inclusion of the layer specific lateral system pressure and the resulting interaction energy with the atomic volumes as an additional energy contribution in the calculation of the state specific free energies and Boltzmann factors of molecules in the simulated inhomogeneous system, supplementing the energy contributions arising from the quasi-chemical interactions of the surface segments. The system pressure is calculated from the spacefilling ratio, i.e. the ratio of atom volume probability and available geometric volume in each layer. The atom volume probability is calculated from the mole fractions of the compounds in the system and the Boltzmann probabilities of the possible states of the molecules in the system. Because overpopulation produces a high pressure penalty, the Boltzmann probabilities get reduced in overpopulated regions. Therefore, starting from a plausible distribution of the compounds in the simulation volume, initial layer σ-profiles, layer charges and layer volume occupations can be calculated, resulting in initial σ-potentials, layer electrostatic potentials and layer pressures. These lead to state specific free energies of all molecules of the systems and to the corresponding distribution of the molecules over their possible states, i.e. conformations, positions and orientations. By that we get a new distribution of the molecules, resulting in updated layer σ-profiles and layer volume occupations. These are mixed with the previous layer σ-profiles, layer charges and layer volume occupations according to a damping factor. This closes the first iteration cycle of the COSMOplex method. By repeating the same cycle many times, the system minimizes its total free energy and converges to a realistic, self-organized structure. The final output thus comprises of the self-organized distribution of all molecules throughout the simulated system, and of the corresponding free energies of the components.

Computational demands of the inventive method are approximately as follows:
 typical calculations times are 0.5-4 hours on a single CPU,
 optimized new implementation will reduce this by a factor 2-5,
 memory demand is ~0.5 GB.

To improve performance parallelization and extreme damping often required due to the step compressibility function (pressure) should be very efficient, but damping strategies still have room for improvement.

In any case, it can be expected that simulations using the inventive method will be at least a factor 1000 if not a factor 10000 more efficient than corresponding MD simulations.

The inventive method can also be used to calculate liquid crystals. In order to create the conditions for this calculation it is of special interest to add external electric field in the energy calculation of the states during the iterative calculation.

To allow phases to automatically order according to their density, as one would observe it in the lab or centrifuge, external gravity or centrifugal force can be used in the energy calculation of the states.

By calculating the pressure that arises from the statistical thermodynamic over- or underpopulation of spatial regions, a pressure profile can be calculated for the system.

Moreover, the inventive method allows to calculate at least pure and mixed surfactant systems and biomembranes with finite load of solutes, ionic surfactants with self-consistent ion distribution, molecules at liquid-gas interfaces and surface tensions, molecules at liquid-solid interfaces and adsorption constants or confined liquids.

Another approach of the inventive method could be the simulation of a solid surface at one end of a rectangular box or to simulate even a solid at both ends, or in a cylindrical nanotube, i.e., treat confined liquids. This allows to study how the liquid phase arranges (adsorbs) on the surface of the solid with the method steps as follows:
 calculate σ-surface of the solid (either with periodic COSMO or from a cluster COSMO calculation),
 define this σ-surface as residing in the outmost layer, having normal vectors (DIRPLEX) in direction of the box interior,
 define a Lennard-Jones-like solid-penetration penalty for surface segments penetrating into the solid.

In addition, the inventive method can be used to simulate macroscopic distances (µm, mm, cm, m) using exponential grid spacing.

Overall, the inventive method allows for the self-consistent simulation of self-organizing systems just based on COSMO files and it is highly efficient compared with MD simulations ($10^3$ to $10^4$ faster) and it yields very promising preliminary quantitative results.

In a preferred embodiment of the invention the inventive method, preferably the inventive simulation method and/or calculating method, is running on the computer apparatus, preferably in form of a computerized software, preferably wherein the calculation according to the inventive method comprise computer implemented steps, preferably as computerized calculation, particularly preferred as algorithms in a programmed software, preferably as computer software for use on the computer apparatus. The programmed software can be stored on a storage medium as for example on a mobile storage medium, on a client's computer and/or on a server computer processing, storage, and input/output devices executing application programs and the like.

Preferably the invention the simulation can be visualized as a computerized model on a display device and/or the computerized model can be printed or plotted, for example as a 3D-model printed with a 3D-printer. Therefore, another aspect of the invention is a computerized model for visualization the inventive simulation and/or the inventive calculation.

In order to avoid repetition with respect to further advantages of the computer apparatus according to the invention, reference is made to the description of the advantageous refinement of the method of the invention and it will be fully resorted to this.

EXAMPLE

As an example, the volume distribution of additives in an oil-surfactant-water system (decane-C8E3-water) as calculated by the COSMOplex program is shown in the figure.

Further measures to improve the invention are described in more detail below with the description of preferred examples of the invention using the figures. All of the claims, the description or the drawings previous features and/or advantages, including design details, spatial configurations and procedural steps, both for themselves, or in various combinations can be essential to the invention. It should be noted that the figures have only descriptive and is not intended to limit the invention in any way.

Figure 2:
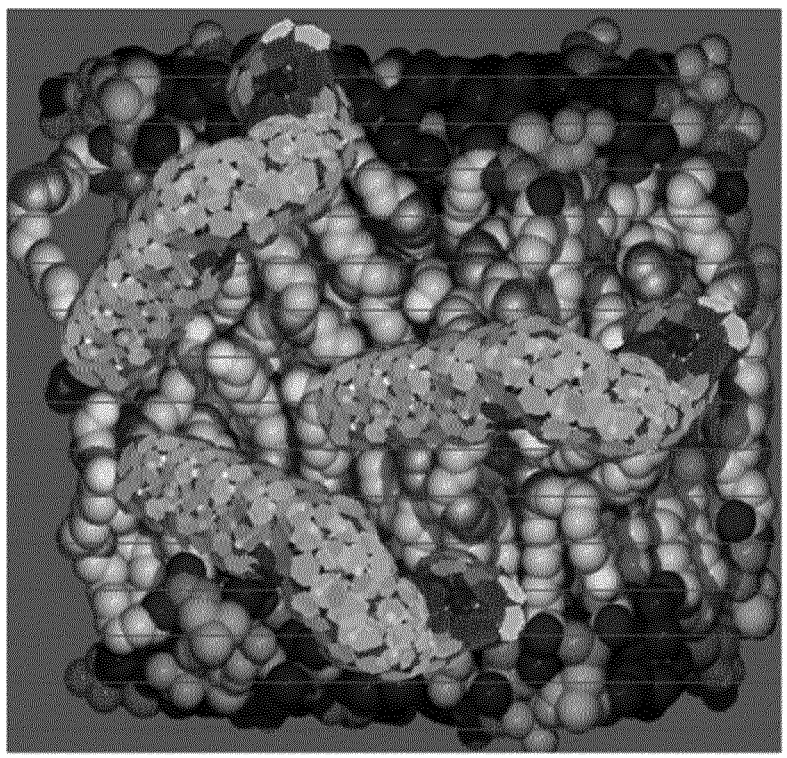
Figure 3:
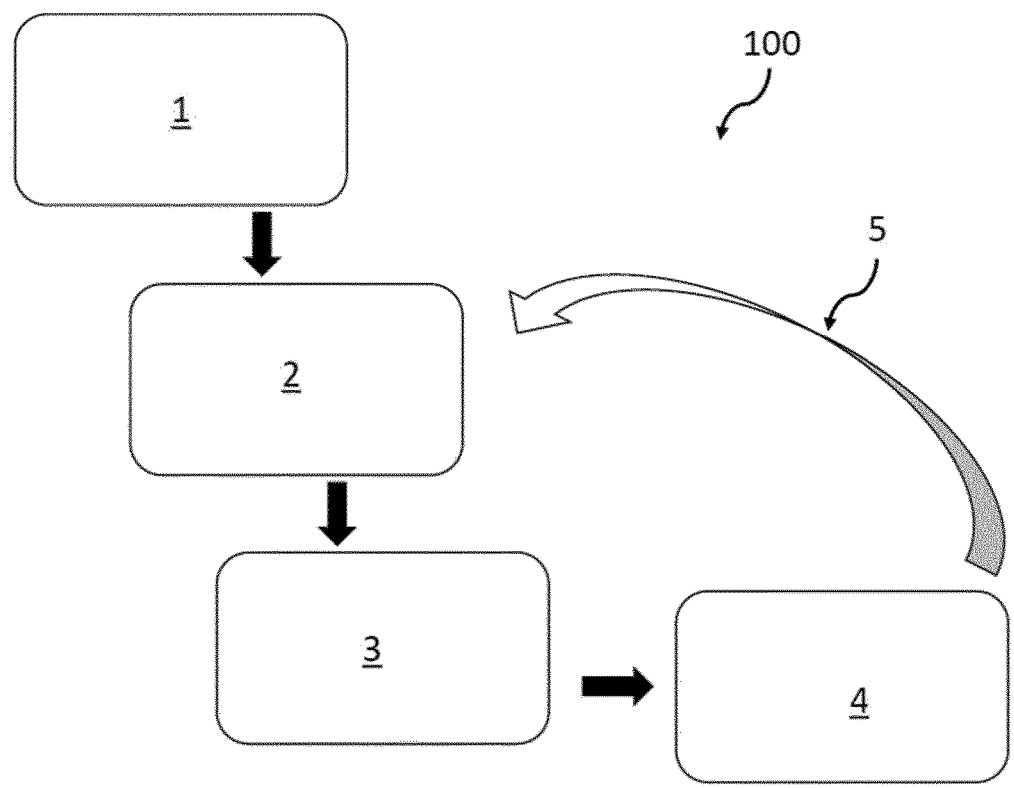
Figure 4:
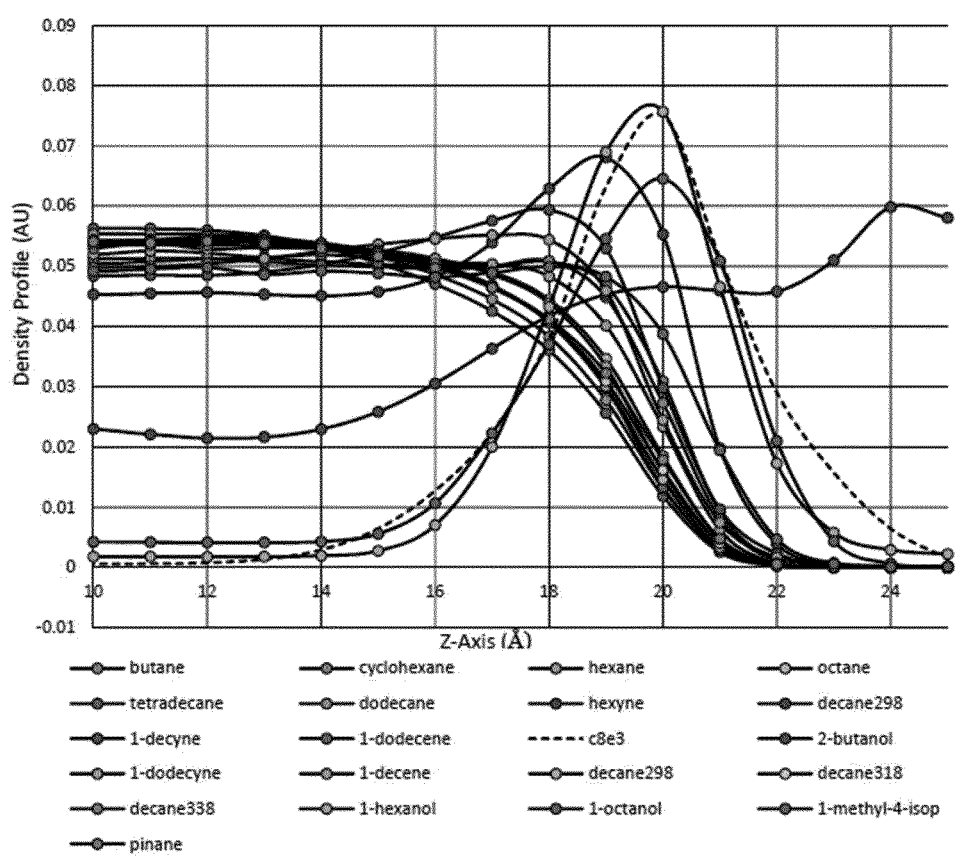
Figure 5:
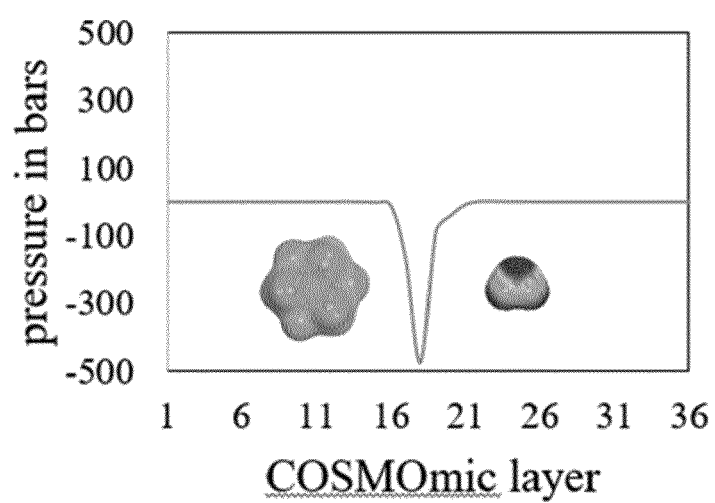

It shows in a schematic illustration:

FIG. 1 computerized model from Acetone-water mixture using COSMORS method,

FIG. 2 a computerized model calculated with the COSMOmic method,

FIG. 3: concept of the inventive method in a workflow diagram,

FIG. 4 a diagram showing volume distribution of additives in an oil-surfactant-water system (decane-C8E3-water) as calculated by the inventive method, and FIG. 5 a computerized model calculated with the inventive COSMOplex method.

FIG. 1 shows a computerized model from Acetone-water mixture with solvent sigma profile, and sigma potential calculated with the COSMORS method for a 50% water, 50% acetone mixture. The full line indicates the σ-profile of the mixture, which is built from the surface segments of the constituents. The dashed line is the resulting σ-potential. The arrows indicate, that the surface segments of different polarity are added to different parts of the σ-profile, and that the σ-potentials corresponding to the polarity of each segment then is put back on the surface of the molecule in order to represent the free energy of the surface segment.

FIG. 2 shows a schematic illustration of the COSMOmic method for shows three different states (positions and orientations) of a solute in front of the background of a DMPC-biomembrane. In each state the different segments of the solute surface reside in different layers and thus feel different σ-potentials. The background is a snapshot of a MD simulation by Tieleman et al. [9].

In FIG. 3 concept of the inventive method 100, mentioned as COSMOplex, is illustrated in a workflow diagram.

Because overpopulation produces a high pressure energy, the Boltzmann probabilities get reduced in overpopulated regions. Therefore, starting from a plausible distribution of the compounds in the simulation volume, initial layer σ-profiles, layer charges and layer volume occupations can be calculated, resulting in initial σ-potentials, layer electrostatic potentials and layer pressures. Thus, in a first step 1 the inventive method 100 starts with building a reasonable start distribution of the compounds under considerations either in a rectangular box, a sphere, or a cylinder, with mirror or periodic boundaries (supported by autobox script).

From the distribution as built in step 1 the layer σ-profiles, layer charges, layer average molar area and volume, and layer spacefilling ratio (occupied molar volume divided by geometrical layer volume) are calculated in a second step 2, resulting in initial σ-potentials, layer electrostatic potentials and layer pressures. These lead to state specific free energies of all molecules of the systems and to the corresponding distribution of the molecules over their possible states, i.e. conformations, positions and orientations. By that we have a new distribution of the molecules, resulting in updated layer σ-profiles and layer volume occupations.

In a third step 3 the layer continuum response functions: $\mu(\sigma,z)$ from $\mu(\sigma,z)$, combinatorial response from average volume and area, electrostatic response $V(z)$ from layer charges, and pressure response from spacefilling is calculated by a Lennard-Jones-like compressibility function.

These are mixed in a fourth step 4 with the previous layer σ-profiles, layer charges and layer volume occupations according to a damping factor.

Therefore, in the fourth step 4 all states (conformers, positions, orientations) of each compound are sampled and the local, state-specific free energy as usual from the local $\mu(\sigma, z)$, the local combinatorial contribution, the local electrostatic potential are calculated and the pressure contribution for each atom by the product atom-volume*pressure(z) is included.

This results in new partition function, new distribution, in new free energy, and finally in converged distribution and free energies of the self-organized compounds and this closes the first iteration cycle of the COSMOplex method 100. By repeating the same cycle many times, shown by the curved arrow 5, the system minimizes its total free energy and converges to a realistic, self-organized structure. The final output thus comprises of the self-organized distribution of all molecules throughout the simulated system, and of the corresponding free energies of the components shown in a computerized model in FIGS. 4 and 5.

FIG. 4 shows volume distribution of additives in an oil-surfactant-water system (decane-C8E3-water) calculated by the inventive method. The additives are butane, tetradecane, 1-decyne, 1-dodecyne, decane at T=338K, pinane, cyclohexane, dodecane, 1-dodecene, 1-decene, 1-hexanol, hexane, hexyne, decane at T=298K, 1-octanol, octane, decane at T=298K, 2-butanol, decane at T=318K and 1-methyl-4-isopropylbenzene. The diagram shows the distribution of the molecules of the additives in the system and the influence of the additives on the system. For example, 1-hexanol behaves like the surfactant and thus has only a small influence on the system.

FIG. 5 shows a schematic illustration of the COSMOplex method. It illustrates pressure profile at a cyclohexane-water interface as calculated self-consistently with COSMOplex.

Aforesaid examples are only carried out by the way of example and do not limit the scope of protection of the present invention.

LIST OF REFERENCES CITED

[1] Guggenheim, E. A. *Mixtures*; Clarendon Press: Oxford, 1952.

[2] Å. Fredenslund, J. Gmehling, P. Rasmussen: Vapor-Liquid Equilibria Using UNIFAC—A Group Contribution Method. Elsevier, Amsterdam 1977.

[3] A. Klamt, Conductor-like screening model for real solvents: a new approach to the quantitative calculation of solvation phenomena, J. Phys. Chem. 99 (1995) 2224-2235. doi:10.1021/j100007a062.

[4] Klamt, A.; Krooshof, G. J. P.; Taylor, R. COSMOSPACE: Alternative to Conventional Activity-Coefficient Models. AIChE J. 2002, 48 (10), 2332-2349.

[5] Zhang, J.; Tuguldur, B.; van der Spoel, D. Force Field Benchmark of Organic Liquids. 2. Gibbs Energy of Solvation. J. Chem. Inf. Model. 2015, 55 (6), 1192-1201.

[6] Zhang, J.; Tuguldur, B.; van der Spoel, D. Correction to Force Field Benchmark of Organic Liquids. 2. Gibbs

[7] A. Klamt, U. Huniar, S. Spycher, J. Keldenich, COSMOmic: a mechanistic approach to the calculation of membrane-water partition coefficients and internal distributions within membranes and micelles, J. Phys. Chem. B. 112 (2008) 12148-12157. doi:10.1021/jp801736k.

[8] Bittermann, K.; Spycher, S.; Endo, S.; Pohler, L.; Huniar, U.; Goss, K.-U.; Klamt, A. Prediction of Phospholipid-Water Partition Coefficients of Ionic Organic Chemicals Using the Mechanistic Model COSMOmic. J. Phys. Chem. B 2014, 118 (51), 14833-14842.

[9] A DMPC micelle consisting of 54 lipids and a few thousand water molecules (schematically), http//indigo1.biop.ox.ac.uk/tieleman/projects.html#micelles

The invention claimed is:

1. A method for computerized calculation of at least one physical property of a liquid system composed of one or more chemical species that includes at least one chemical species dissolved in at least one inhomogeneously distributed chemical species, using a quasi-chemical calculation based on statistical thermodynamics of pairwise interactions of molecular surface segments,
wherein a pressure, arising from statistical thermodynamic over-or underpopulation of spatial regions interacts as a continuum response function with atomic volumes and thus influences thermodynamic weight of a molecular state in the system, during iterative calculation of statistical thermodynamic distribution of molecules in 1-dimensionally, 2-dimensionally, or 3-dimensionally structured simulation volumes of liquid systems, the method comprising:
introducing a pressure energy penalty supplementing other energy contributions and reducing a probability of molecules to be in overcrowded spatial regions, so that distribution of solute molecules in the liquid system and a structure of the chemical species are self-consistently calculated without using external information;
computerized calculating of the at least one physical property of the liquid system composed of one or more chemical species; and
simulating a behavior of the liquid system, having the calculated at least one physical property according to a self-consistently calculated distribution of solute molecules and structure of chemical species, at macroscopic distances using exponential grid spacing.

2. The method according to claim 1, wherein the pressure is used as an additional energy contribution in the thermodynamic weight of a molecular state in the system with the energy contributions, that arise from interactions of molecular surfaces by quasi-chemical calculation.

3. The method according to claim 1, wherein a pressure profile arising from the statistical thermodynamic over-or underpopulation of spatial regions, is used.

4. The method according to claim 1, wherein the system is a micelle or a membrane.

5. The method according to claim 1, wherein the method is computer-implemented.

6. The method according to claim 1, the method further comprising 3D printing, by a 3D printer, a self-consistently calculated structure of the chemical species.

7. A computer apparatus for computerized calculation of at least one physical property of a liquid system composed of one or more chemical species that includes at least one chemical species dissolved in at least one inhomogeneously distributed chemical species, using a quasi-chemical calculation involving calculation of pressure, that arises from statistical thermodynamic over-or underpopulation of spatial regions comprising:
a processor; and
memory having stored thereon a program that when executed by the processor causes the processor to be configured to:
introduce a pressure energy penalty supplementing other energy contributions and reducing a probability of molecules to be in overcrowded spatial regions, so that distribution of solute molecules in the system and a structure of the chemical species are self-consistently calculated without using external information;
computerized calculate the at least one physical property of the liquid system composed of one or more chemical species; and
simulate a behavior of the liquid system, having the calculated at least one physical property according to a self-consistently calculated distribution of solute molecules and structure of chemical species, at macroscopic distances using exponential grid spacing,
wherein a pressure, arising from the statistical thermodynamic over-or underpopulation of spatial regions interacts as a continuum response function with atomic volumes and thus influences thermodynamic weight of a molecular state in the system, during iterative calculation of statistical thermodynamic distribution of molecules in 1-dimensionally, 2-dimensionally, or 3-dimensionally structured simulation volumes of liquid systems.

* * * * *